US007623185B2

(12) United States Patent
Wang et al.

(10) Patent No.: US 7,623,185 B2
(45) Date of Patent: Nov. 24, 2009

(54) SYNCHRONIZATION CONTROL APPARATUS AND METHOD

(75) Inventors: Ching-Tzong Wang, Kao-Hsiung (TW); Szu-Ping Chen, Hsin-Chu Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 843 days.

(21) Appl. No.: 11/306,195

(22) Filed: Dec. 19, 2005

(65) Prior Publication Data

US 2006/0197758 A1 Sep. 7, 2006

(30) Foreign Application Priority Data

Dec. 20, 2004 (TW) .............................. 93139700 A

(51) Int. Cl.
*H04N 5/04* (2006.01)
*H04N 5/10* (2006.01)

(52) U.S. Cl. ........................ 348/500; 348/529; 348/547

(58) Field of Classification Search ................. 348/500, 348/521, 529, 547; 345/213; 375/354; *H04N 5/04, H04N 5/06, 5/10*
See application file for complete search history.

(56) References Cited

U.S. PATENT DOCUMENTS 5,631,709 A * 5/1997 Lam et al. .................. 348/529
6,268,848 B1 7/2001 Eglit
7,199,834 B2 * 4/2007 Fujii et al. .................. 348/521

FOREIGN PATENT DOCUMENTS

JP 61152186 A * 7/1986
JP 04282971 A * 10/1992
JP 2001008172 A * 1/2001

* cited by examiner

*Primary Examiner*—Sherrie Hsia
(74) *Attorney, Agent, or Firm*—Winston Hsu

(57) ABSTRACT

A synchronization control apparatus for driving a display module in an interlacing scan mode includes: a delay circuit for delaying an input vertical sync (IVS) signal to generate a delayed signal; and a multiplexer coupled to the delay circuit for selecting one of the IVS signal and the delayed signal according to an odd/even field indication signal to generate an output vertical sync (OVS) signal.

13 Claims, 2 Drawing Sheets

SYNCHRONIZATION CONTROL APPARATUS AND METHOD

BACKGROUND OF THE INVENTION

1. Field of the Invention

The present invention relates to monitors, and more particularly, to monitor controllers.

2. Description of the Prior Art

In an interlaced scan signal, each frame includes an odd field and an even field respectively having a plurality of odd scan lines and a plurality of even scan lines. Within the scan lines, the portion constituting display data, or active data, corresponds to an image displayed with rows of pixels of a video display device. Taking an NTSC system as an example, as is well known in the art, one of the odd field and the even field has one scan line more than the other. Therefore, as the vertical sync (VS) signals are sampled and synchronized according to the horizontal sync (HS) signals, a digital display signal generated after receiving and decoding a source signal will result in a VS signal having a one-scan-line time difference between a pulse interval corresponding to the odd field and a pulse interval corresponding to the even field.

In subsequent processing of the digital domain, for example, interpolation or other operations, a VS signal before processing is usually referred to as the input vertical sync (IVS) signal, and a VS signal after processing is usually referred to as the output vertical sync (OVS) signal or the destination vertical sync (DVS) signal. For typical video processing, in order to achieve normal video display without utilizing excessive memories to perform buffering of input/output (I/O) frames, the OVS signal is typically controlled to be synchronous with the IVS signal. Therefore, the aforementioned phenomenon of the difference between the pulse interval corresponding to the odd field and the pulse interval corresponding to the even field propagates from input to output. In this situation, some display panels probably cannot display normally due to incompatibility problems.

In addition, within each frame, the odd scan lines in the odd field and the even scan lines in the even field respectively correspond to different locations of the image of the frame. For example, in the image of the frame, the first scan line of the even scan lines is located under the first scan line of the odd scan lines, and the second scan line of the odd scan lines is located under the first scan line of the even scan lines, and so on. However, as is well known in the art, performing video processing operations with the data of the odd field and the data of the even field in the same way will introduce vertical jittering to the images.

SUMMARY OF THE INVENTION

It is an objective of the claimed invention to provide synchronization control apparatuses and methods, in order to eliminate the aforementioned phenomenon of the difference between the pulse interval corresponding to the odd field and the pulse interval corresponding to the even field in the output vertical sync (OVS) signal.

It is another objective of the claimed invention to provide video processing apparatuses and methods, in order to prevent the aforementioned vertical jittering problem of the images resulting from different locations of the odd scan lines and the even scan lines in the image of the frame.

According to one embodiment of the claimed invention, a synchronization control apparatus for driving a display module in an interlaced scan mode is disclosed. The synchronization control apparatus comprises: a delay circuit for delaying an input vertical sync (IVS) signal to generate a delayed signal; and a first multiplexer coupled to the delay circuit for selecting one of the IVS signal and the delayed signal according to an odd/even field indication signal to generate an OVS signal.

According to one embodiment of the claimed invention, a synchronization control method for driving a display module in an interlaced scan mode is further disclosed. The synchronization control method comprises: delaying an IVS signal to generate a delayed signal; and selecting one of the IVS signal and the delayed signal according to an odd/even field indication signal to generate an OVS signal.

According to one embodiment of the claimed invention, a display control apparatus is also disclosed. The display control apparatus comprises: a video processing circuit for receiving an interlaced scan video signal to perform video processing; a selection signal generation circuit for generating a selection signal; a delay circuit for receiving an IVS signal corresponding to the interlaced scan video signal, and delaying the IVS signal to generate a delayed signal; and a multiplexer coupled to the delay circuit and the selection signal generation circuit for selecting one of the IVS signal and the delayed signal according to the selection signal to generate an OVS signal; wherein a value of the selection signal corresponds to an interval between pulses of the IVS signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
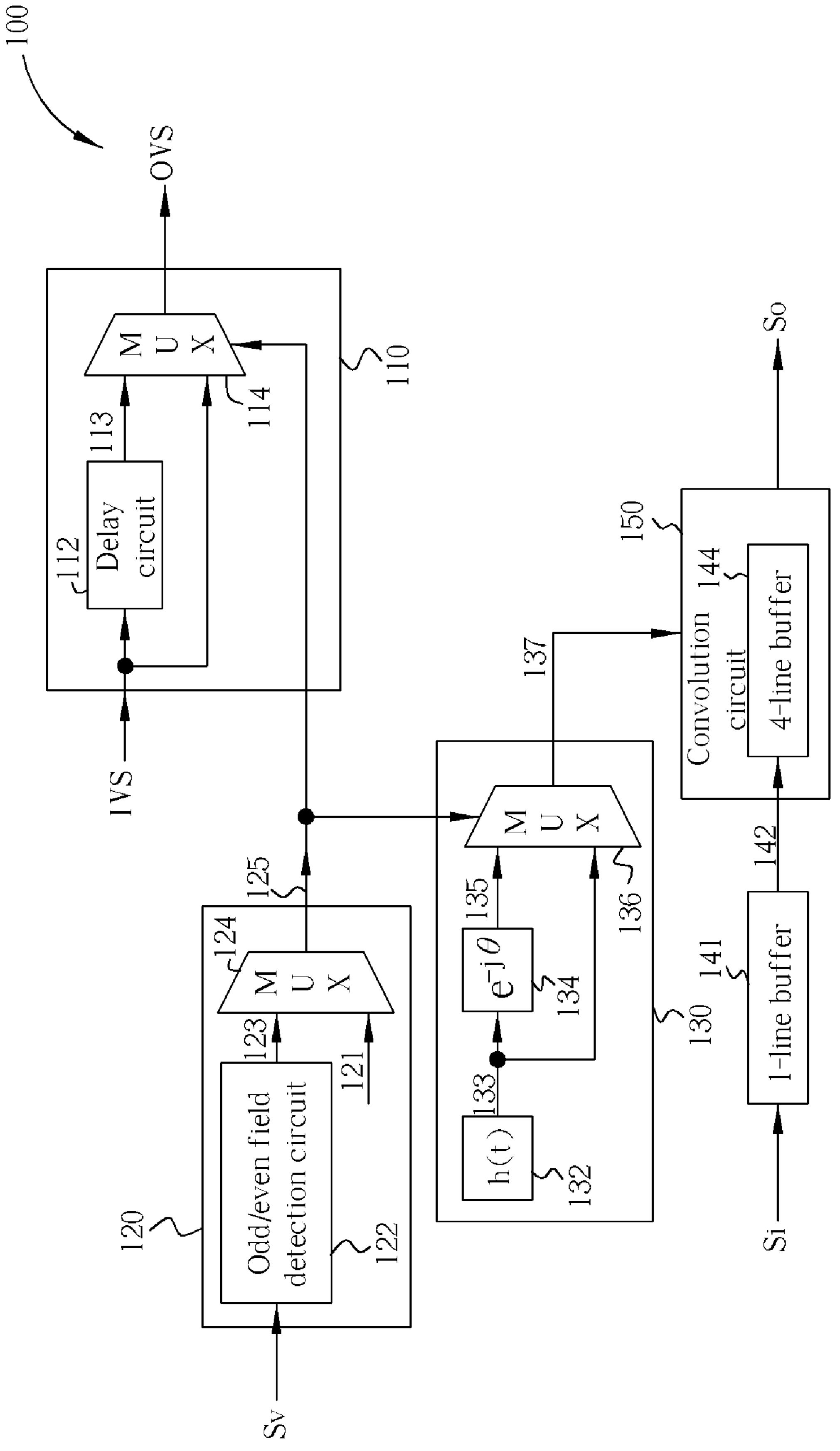
FIG. 1 is a diagram of a synchronization control apparatus according to one embodiment of the present invention.

Please refer to FIG. 1. FIG. 1 is a diagram of a display controller 100 according to one embodiment of the present invention. As is well known in the art, the display controller 100 can be an LCD monitor controller, an LCD TV controller, or a digital TV controller, but the display controller 100 is certainly not limited to these specific examples. The display controller 100 is utilized for driving a display module such as an LCD panel under an interlaced scan mode. According to one embodiment of the present invention, the display controller 100 comprises: a vertical sync (VS) adjustment module 110, an odd/even field indication signal generation module 120, a function data generation module 130, and a convolution circuit 150. The VS adjustment module 110 comprises a delay circuit 112 and a multiplexer 114, the odd/even field indication signal generation module 120 comprises an odd/even field detection circuit 122 and a multiplexer 124, and the function data generation module 130 comprises a function data storage circuit 132, a function conversion circuit 134, and a multiplexer 136. As shown in FIG. 1, the convolution circuit 150 comprises a 4-line buffer 144. In addition, the display controller 100 further comprises a 1-line buffer 141 coupled to the 4-line buffer 144. Please note that the buffer 144 in the convolution circuit 150 is not limited to having four lines, where other number of lines of the buffer in the convolution circuit 150 can be applied to other embodiments of the present invention according to the requirement for the convolution operation of the convolution circuit 150.

Figure 2:
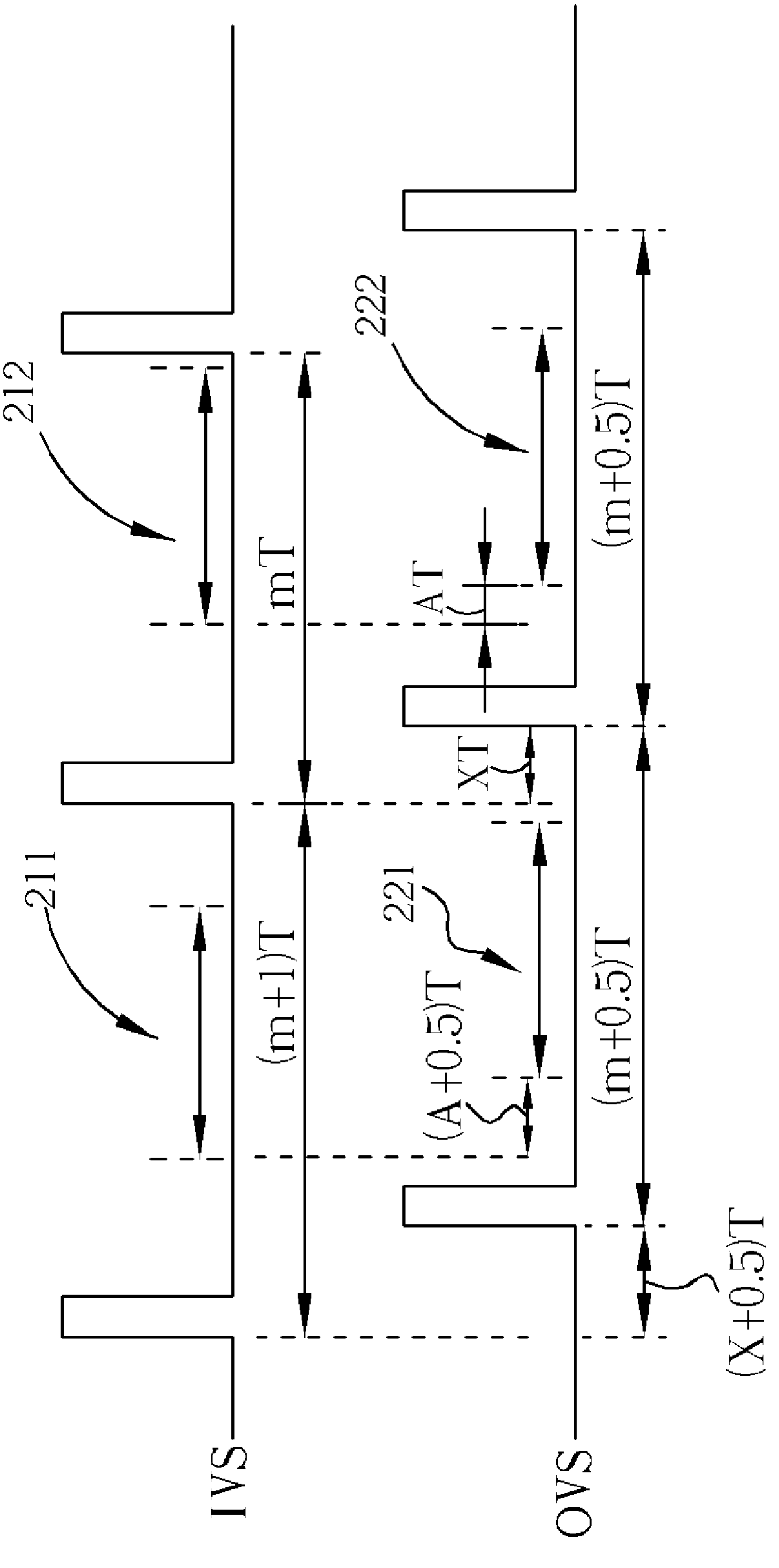
FIG. 2 is a diagram of the input vertical sync (IVS) signal and the output vertical sync (OVS) signal shown in FIG. 1.

The VS adjustment module 110 is capable of converting an input vertical sync (IVS) signal (i.e., IVS shown in FIG. 1 and FIG. 2) into an output vertical sync (OVS) signal (i.e., OVS shown in FIG. 1 and FIG. 2). As shown in FIG. 2, after previous stage operations, there exists a difference T between a pulse interval corresponding to an odd field and a pulse interval corresponding to an even field in the IVS signal, where the difference T is a scan time corresponds to one scan line. According to the IVS signal inputted as shown in FIG. 2, the odd field includes (m+1) scan lines, and the even field includes m scan lines, so the time interval between the pulse at the beginning location of the odd field and the next pulse is (m+1)T, and the time interval between the pulse at the beginning location of the even field and the next pulse is mT. In addition, as shown in FIG. 2, in order to adapt to the requirement of the later stage, i.e., the display panel, it is desirable to make a pulse interval corresponding to an odd field and a pulse interval corresponding to an even field in the OVS signal to be equal to each other. According to this embodiment, the delay circuit 112 delays the IVS signal by applying a delay amount of a half of a scan time corresponding to a scan line to the IVS signal to generate a delayed signal 113. That is, the delay circuit 112 applies a delay amount of a half of a scan time corresponding to a scan line, i.e., 0.5T, to the IVS signal. In addition, the multiplexer 114 selects one of the IVS signal and the delayed signal 113 according to an odd/even field indication signal 125 generated by the odd/even field indication signal generation module 120 to generate the OVS signal, as shown in FIG. 2. Thus, the odd field in the OVS signal has (m+0.5) scan lines and the even field in the OVS signal also has (m+0.5) scan lines, as shown in FIG. 2. Therefore, the time interval between the pulse at the beginning location of the odd field and the next pulse is (m+0.5)T, and the time interval between the pulse at the beginning location of the even field and the next pulse is also (m+0.5)T, so the pulse intervals of the odd field and the even field are the same.

Regarding the odd/even field indication signal generation module 120, for a video display apparatus that does not require a VGA display mode as a display mode, an input signal set of the video display device typically comprises an odd/even field detection signal 121 as shown in FIG. 1, where the odd/even field detection signal 121 is utilized for representing whether a frame that is currently inputted corresponds to an odd field or an even field. However, for a video display apparatus that does require the VGA display mode as a display mode, this embodiment utilizes the odd/even field detection circuit 122 shown in FIG. 1 to detect whether a video signal Sv of the VGA display mode corresponds to an odd field or an even field, to generate an odd/even field detection signal 123 for replacing the aforementioned odd/even field detection signal 121. The multiplexer 124 selects one of the odd/even field detection signal 123 corresponding to the VGA display mode and the odd/even field detection signal 121 corresponding to another display mode as the odd/even field indication signal 125 according to a display mode indication signal (not shown in FIG. 1).

As shown in FIG. 1, the function data generation module 130 is capable of generating the function data 137 corresponding to the odd field or the even field according to the odd/even field indication signal 125 mentioned above, to provide the convolution circuit 150 with the function data 137 for the convolution operation, in order to implement functionalities such as interpolation and/or scaling, etc., which are typically needed in a display controller known in the art. The function data storage circuit 132 stores the function data 133 corresponding to a function h(t), where the function h(t) represents a response function, and typically, the function h(t) can be defined as follows:

$$h(t)=a*t+b,\ \text{if } 0\leqq t\leqq -(b/a);$$

$$h(t)=-a*t+b,\ \text{if } (b/a)\leqq t<0;\ \text{and}$$

$$h(t)=0,\ \text{if } t>-(b/a)\ \text{or}\ t<(b/a);$$

where a<0 and b>0.

It is noted that the function h(t) mentioned above merely serves as an example, which is not meant to be a limitation of the present invention. In addition, the function h(t) is well known in the art, and therefore not explained in detail herein. In this embodiment, the function data 133 is discretely stored in the function data storage circuit 132 utilizing a lookup table. In addition, the function conversion circuit 134 is capable of converting the function data 133 into the function data 135 corresponding to the function $(h(t)*e^{-j\theta})$, where the functions h(t) and $(h(t)*e^{-j\theta})$ correspond to a phase adjustment value θ. As a result, the multiplexer 136 selects one of the function data 133 corresponding to the function h(t) and the function data 135 corresponding to the function $(h(t)*e^{-j\theta})$ as the function data 137 corresponding to the odd field or the even field, according to the odd/even field indication signal 125 mentioned above.

As shown in FIG. 1, the buffers 141 and 144 are utilized for buffering an input video data Si, and the input video data Si is processed by the convolution circuit 150 to generate an output video data So, where the output video data So is utilized for driving the display module. According to this embodiment, the convolution circuit 150 performs the convolution operation according to the input video data Si and the function data 137 to generate the output video data So. If the odd/even field indication signal 125 indicates that the frame that is currently inputted corresponds to the even field, the output video function So(t) represented by the output video data So is a convolution result of the input video function Si(t) represented by the input video data Si and the function $(h(t)*e^{-j\theta})$; if the odd/even field indication signal 125 indicates that the frame that is currently inputted corresponds to the odd field, the output video function So(t) represented by the output video data So is a convolution result of the input video function Si(t) represented by the input video data Si and the function h(t).

It should be noted that those described above is merely one of different embodiments of the present invention, and is not meant to be a limit of the present invention. The present invention can be applied to various video specifications known in the art, for example, NTSC or PAL specifications. If the IVS signal complies with a certain specification and has any pulse interval that is longer or shorter than others, when the IVS signal is inputted into the display controller 100, the multiplexer 114 in the VS adjustment module 110 will multiplex and select the delayed signal 113 as the OVS signal when the display controller 100 detects a frame corresponding to the pulse interval that is longer than others, and will multiplex and select the original IVS signal as the OVS signal when the display controller 100 detects a frame corresponding to the pulse interval that is shorter than others. On the other hand, if a frame signal complies with a certain specification and has an upper field and a lower field, when the frame signal is inputted into the display controller 100, the function data generation module 130 outputs the function h(t) to the convolution circuit 150 when the display controller 100 detects information of the upper field, and outputs the shifted function $(h(t)*e^{-j\theta})$ to the convolution circuit 150 when the display controller 100 detects information of the lower field.

It should be further noted that the input video data Si corresponding to the odd field appears in the time interval 211, and the input video data Si corresponding to the even field appears in the time interval 212, as shown in FIG. 2. As a result of utilizing the convolution operation mentioned above, the output video data So corresponding to the odd field appears in the time interval 221, and the output video data So corresponding to the even field appears in the time interval 222, as shown in FIG. 2. That is, as a result of utilizing the convolution circuit 150 in this embodiment, the time that the display data corresponding to the odd field is processed is advanced by the scan time corresponding to a half of one scan line, where after being processed, the display data corresponding to the odd field is then discarded. So, buffer utilization for the odd field and the even field may approach to be identical. Therefore, according to the adjustment that the VS adjustment module 110 performs on the IVS signal, although the OVS signal's pulse interval corresponding to the odd field is different from the IVS signal's pulse interval corresponding to the odd field and the OVS signal's pulse interval corresponding to the even field is different from the IVS signal's pulse interval corresponding to the even field, the function data generation module 130 and the convolution circuit 150 co-operate to prevent wasting the storage volume of the buffers on display data corresponding to a half of one scan line. Therefore, the buffer utilization, especially for the storage volume thereof, is optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronization control apparatus for driving a display module in an interlaced scan mode, the synchronization control apparatus comprising:

a delay circuit for delaying an input vertical sync (IVS) signal to generate a delayed signal;

a first multiplexer coupled to the delay circuit for selecting one of the IVS signal and the delayed signal according to an odd/even field indication signal to generate an output vertical sync (OVS) signal;

a second multiplexer coupled to the first multiplexer for selecting one of a first data corresponding to a first function and a second data corresponding to a second function as a third data according to the odd/even field indication signal; and a convolution circuit coupled to the second multiplexer for performing a convolution operation according to an input video data and the third data to generate an output video data to be utilized for driving the display module.

2. The synchronization control apparatus of claim 1, wherein the convolution circuit includes a buffer for buffering the input video data.

3. The synchronization control apparatus of claim 2, wherein the convolution circuit is a 4-line buffer.

4. The synchronization control apparatus of claim 1, further comprising:

a function conversion circuit coupled to the second multiplexer for converting the first data into the second data, wherein the first and second functions correspond to a phase adjustment value.

5. The synchronization control apparatus of claim 1, further comprising:

an odd/even field detection circuit for detecting whether a video signal of a second display mode corresponds to an odd field or an even field to generate a second odd/even field detection signal; and a third multiplexer coupled to the odd/even field detection circuit for selecting one of a first odd/even field detection signal corresponding to a first display mode and the second odd/even field detection signal corresponding to the second display mode as the odd/even field indication signal according to a display mode indication signal.

6. A synchronization control method for driving a display module in an interlaced scan mode, the synchronization control method comprising:

delaying an input vertical sync (IVS) signal to generate a delayed signal;

selecting one of the IVS signal and the delayed signal according to an odd/even field indication signal to generate an output vertical sync (OVS) signal;

selecting one of a first data corresponding to a first function and a second data corresponding to a second function as a third data according to the odd/even field indication signal; and performing a convolution operation according to an input video data and the third data to generate an output video data to be utilized for driving the display module.

7. The synchronization control method of claim 6, wherein the step of performing the convolution operation further comprises:

buffering the input video data.

8. The synchronization control method of claim 7, wherein the step of buffering the input video data further comprises:

providing a 4-line buffer for buffering the input video data.

9. The synchronization control method of claim 6, further comprising:

converting the first data into the second data, wherein the first and second functions correspond to a phase adjustment value.

10. The synchronization control method of claim 6, further comprising:

detecting whether a video signal of a second display mode corresponds to an odd field or an even field to generate a second odd/even field detection signal; and selecting one of a first odd/even field detection signal corresponding to a first display mode and the second odd/even field detection signal corresponding to the second display mode as the odd/even field indication signal according to a display mode indication signal.

11. A display control apparatus comprising:

a video processing circuit for receiving an interlaced scan video signal to perform video processing;

a selection signal generation circuit for generating a selection signal;

a delay circuit for receiving an input vertical sync (IVS) signal corresponding to the interlaced scan video signal, and delaying the IVS signal to generate a delayed signal; and a multiplexer coupled to the delay circuit and the selection signal generation circuit for selecting one of the IVS signal and the delayed signal according to the selection signal to generate an output vertical sync (OVS) signal;

wherein a value of the selection signal corresponds to an interval between pulses of the IVS signal and the video processing circuit is utilized for performing a convolution operation on the interlaced scan video signal.

12. The display control apparatus of claim 11, being an LCD monitor controller.

13. The display control apparatus of claim 11, being a digital TV controller.

* * * * *